March 11, 1941.  D. I. REITER  2,234,577
HANDLE LOOP
Filed Aug. 22, 1940  2 Sheets-Sheet 1
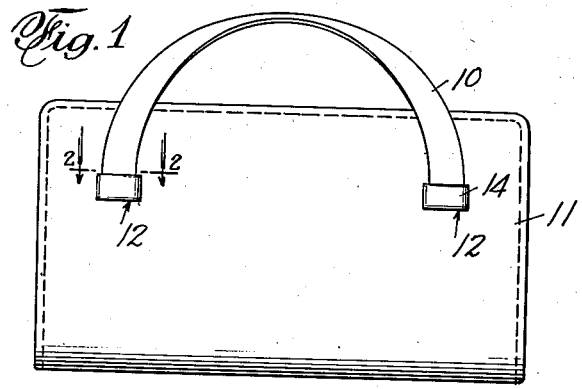
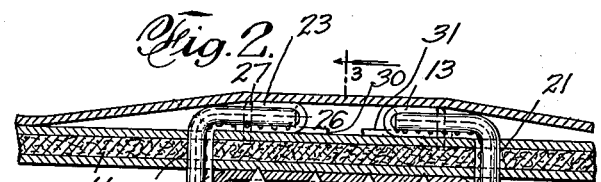
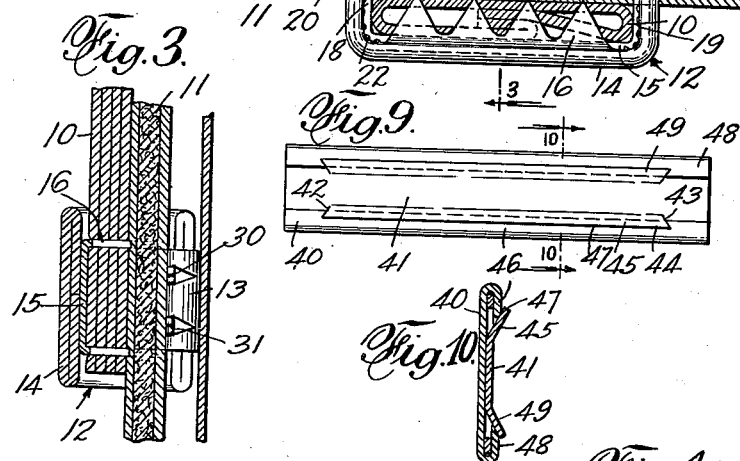
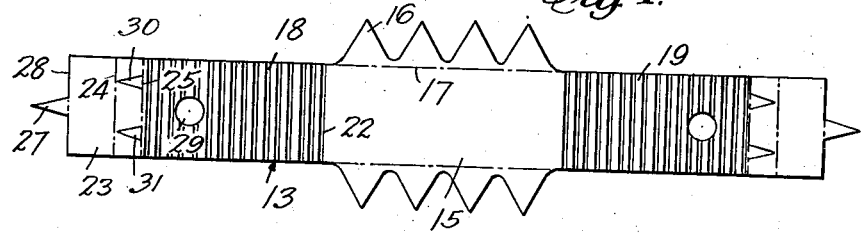
INVENTOR
*Daniel I. Reiter*
BY
ATTORNEY March 11, 1941.  D. I. REITER  2,234,577
HANDLE LOOP
Filed Aug. 22, 1940  2 Sheets-Sheet 2
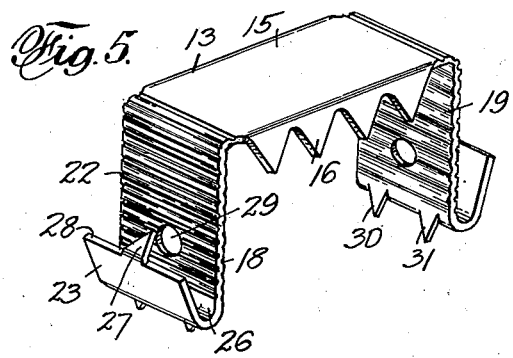
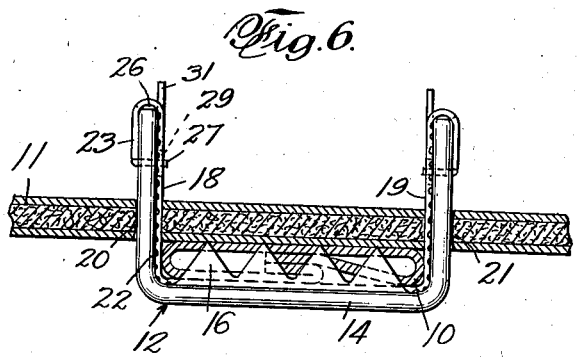
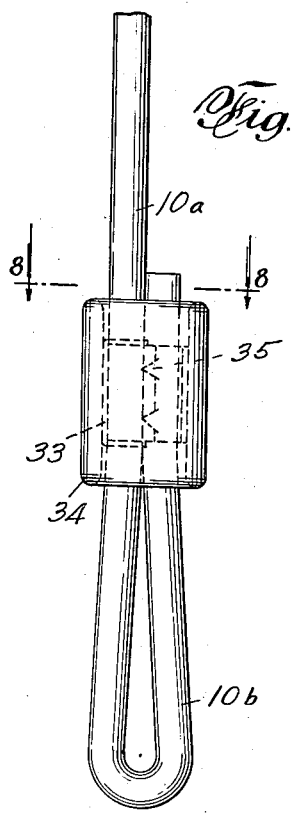
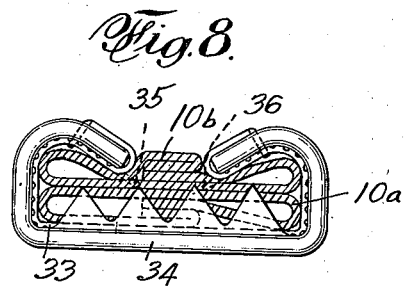
INVENTOR
Daniel I. Reiter
BY
ATTORNEY Patented Mar. 11, 1941

2,234,577

UNITED STATES PATENT OFFICE 2,234,577

HANDLE LOOP

Daniel I. Reiter, New York, N. Y.

Application August 22, 1940, Serial No. 353,601

6 Claims. (Cl. 24—265)

This invention relates to the fasteners for securing the strap or handle of a pocketbook, handbag or the like in place.

My invention contemplates the provision of a metallic sheet metal fastener readily bendable into the desired form to secure certain parts together in a variety of ways and provided with prongs functioning to adequately secure a covering or ornamental sheet around the fastener as well as to secure the fastener to a strap or handle.

The various objects of the invention will be clear from the description which follows and from the drawings, in which, Fig. 1 is a front elevation of a pocketbook showing one way in which my invention has been applied to hold a handle strap in place.

Fig. 2 is an enlarged fragmentary horizontal section of the same taken on the line 2—2 of Fig. 1.

Fig. 3 is a vertical section of the same taken on the line 3—3 of Fig. 2.

Fig. 4 is an elevational view of the flat blank from which the fastener or handle loop is bent.

Fig. 5 is a perspective view of the fastener or handle loop in the form in which it is manufactured and supplied to the user and before being covered or bent in place in the article in which it is used.

Fig. 6 is a fragmentary horizontal section of a bag similar to Fig. 2 but before the fastener has been bent on to the rear face of the bag wall or the inner lining applied.

Fig. 7 is a side view of a strap handle doubled back on itself to form a loop which is fastened in place by my improved fastener.

Fig. 8 is a horizontal section of the same taken on the line 8—8 of Fig. 7.

Fig. 9 is an elevational view of a modified form of a combined metallic handle loop and its flexible cover prior to the bending thereof into loop form.

Fig. 10 is a vertical section taken on the line 10—10 of Fig. 9.

The fastener or handle loop forming the feature of the present invention may be used in a number of different ways to accomplish various fastening functions. The uses illustrated are to secure the handle strap of a bag to the wall thereof, and to secure the parts of a doubled strap together. In each case, however, the fastener is also used to carry a covering sheet which serves to conceal the fastener from view and also serves as an ornamental finishing member.

In the practical embodiment of the invention which I have shown to illustrate one use of the fastener, the handle 10 is held to the bag or pocketbook 11 at its ends by means of a pair of similar covered handle loops or fasteners each designated generally by the numeral 12. As shown in Figs. 2, 3, 4, 5 and 6, the bendable blank 13 from which the fastener is formed is made preferably of sheet metal easily bent by the user into its final form and into its intermediate form in which it is adapted to firmly hold a flexible non-metallic covering sheet 14 concealing the metallic member and presenting an ornamental and finished appearance.

As best seen in Fig. 4, the fastener may readily be stamped in the form of a one piece blank 13 from a sheet of metal and comprises the central front wall 15 the length of which is substantially the same or slightly greater than the width of the strap or handle 10, and side wall parts 18 and 19 bent at substantially right angles to the front wall 15. At each of the longitudinal edges of the blank at the central part 15 are formed the teeth 16 bent along the fold lines 17 at the edge of the blank into a position at right angles to the plane of the blank as is shown in Figs. 5 and 6. When the fastener is assembled with the handle 10 and the bag wall 11, the teeth 16 pierce or penetrate the end portion of the handle and aid in holding said handle in place and against detachment under the stresses of use.

The walls 18 and 19 of the fastener as well as the covering sheet parts at said walls are passed through suitable slits as 20, 21 respectively in the wall 11 of the bag until the front wall 15 presses the strap against the front face of the wall 11 and the prongs 16 enter the strap. A series of parallel spaced score lines or corrugations as 22 are formed across the side walls 18 and 19 and in part of the wall 15. By selecting the particular score line on which the blank is bent between the walls 15 and 18, and 15 and 19, different thicknesses of different straps 10 may be provided for and the same fastener used for straps of different widths and thicknesses.

The end portion 23 of the blank is doubled back toward and in spaced relation to the side wall 18 about the fold lines 24 and 25 to provide a space 26 for the reception of the end part of the cover sheet 14 which covers the side walls 18 and 19, and the front wall 15. A prong 27 projecting from the end 28 of the blank is bent to pass through the end part of the cover and through the opening 29 in the wall 18 to firmly secure the cover sheet to the fastener when the part 23 is bent toward the side wall 18. Both ends of the blank 13 being identical, it will be understood that the above description of one end part of the blank and of the holding prong will suffice for both.

Additional prongs as 30, 31 coplanar with the side wall 18 and a pair of similar prongs coplanar with the side wall 19 are also preferably provided, it being understood, however, that where the fastener is used as in Figs. 2 and 6, said prongs 30, 31 may be omitted. Each of the prongs is cut from the material between the fold lines 24 and 25 by a pair of converging slits (Fig. 3). Said prongs function best for that use of the invention shown in Figs. 7 and 8 as will be later described more fully.

It will be understood that the form in which the fastener is supplied to the user is that shown in Fig. 5. The user may change the lengths of the walls 15, 18 and 19 by making the bends between said walls occur at a different one of the score lines 22 from that initially selected, thereby to adapt the fastener for a strap of a different width or thickness from that for which the fastener may have been originally bent. The user then inserts the ends of the cover sheet into the spaces 26 and bends the end parts 23 toward the adjacent side wall to force the prong 27 through the cover sheet and through the opening 29 and thereby to secure the cover sheet adequately to the fastener. The side walls 18 and 19 together with the cover sheet parts attached thereto are passed through the respective slits 20 and 21 of the wall 11, the end of the handle 10 having been inserted in the space between the wall 15 and the front wall of the bag. As the fastener is pushed through the slits, the prongs 16 firmly grip the strap 10. Those parts of the fastener projecting beyond the rear face of the bag wall 11 (Fig. 6) are bent toward each other from the position of Fig. 6 into the position of Fig. 2, against the rear face of the wall 11 to compress the strap 10, the prongs 30, 31 lying against said rear face or possibly entering said rear face to some extent.

As has been indicated, the fastener may be used in various ways to hold parts together. In Figs. 7 and 8, I have shown the fastener used for the purpose of forming a loop 10b in a strap 10a. In this form of the invention, the metallic fastener 33 is covered with the sheet 34 in the manner hereinbefore explained. However, because of the double thickness of the loop 10a, 10b, the side walls of the fastener are bent along different score lines 22 than those in the case of the form of Fig. 6. Preferably, the inner ends of the wall part 18 are bent into converging relation so that the prongs 35, 36 corresponding to the prongs 30, 31 are forced into the loop 10b thereby to prevent any possibility of the part becoming unfastened under stress.

It will be noted that by the proper arrangement of prongs, the cover sheet 14 is adequately held to the fastener and that in the case of the loop of Figs. 7 and 8, the strap parts are firmly secured together against possibility of detachment under stress.

In that form of the invention shown in Figs. 9 and 10, the various prongs and openings hereinbefore described in connection with the blank 13 are omitted and in place thereof the cover sheet 40 is otherwise held to the bendable metallic sheet 41. Said sheet 41 is provided with a pair of inclined or converging slits 42 and 43 joined by the slit 44 and thereby providing a flap 45 adapted to be separated laterally from the face or body portion of the sheet a slight distance, preferably slightly less than the thickness of the cover sheet 40. The edge portion 46 of said cover sheet may thereby be inserted underneath the edge 47 of the flap 45 and past said edge as far as may be permitted by the slits 42 and 43 and the amount of separation of the flap 45 from the remainder of the metallic sheet. Said flap 45 is then squeezed down upon the inserted edge portion 46 to hold it in place. Similarly, the other edge portion 48 of the sheet is passed underneath the flap 49, similar to the flap 45, and similarly formed. The cover sheet is thereby held to the metallic sheet 41 and may be bent as a unit therewith to pass through the slits 20 and 21 and on the bag wall and again bent at its end portions to hold a suitable strap to the bag wall in a manner hereinbefore described in connection with the handle loop 12. Or the covered metallic sheet may be bent to serve as a fastening means for other parts in a manner which will now be readily understood.

It will be seen that I have provided a simple and economical fastener adapted for a number of uses in holding bag, strap and other parts together firmly and securely and designed also to adequately hold an ornamental covering or concealing sheet adequately in place thereon.

While I have shown and described certain specific embodiments of the invention, I do not wish to be understood as limiting myself thereto, but intend to claim the invention as broadly as may be permitted by the state of the prior art and the scope of the appended claims.

I claim:

1. A handbag or the like fastener of a single piece of sheet metal having a pair of spaced side walls each terminating in a bent end portion arranged outwardly of the wall, a front wall joining the side walls, a prong on each bent end portion directed toward the side wall, and prongs on the front wall bent into a position substantially perpendicular to the plane of the front wall.

2. A handbag or the like fastener of a single piece of sheet metal having a pair of spaced side walls each terminating in a bent end portion arranged outwardly of the wall, a front wall joining the side walls, a prong on each bent end portion directed toward the side wall, and prongs on the front wall bent into a position substantially perpendicular to the plane of the front wall, said side walls each having a plurality of spaced parallel transverse score lines therein on a selected one of which the side wall is bendable relatively to the front wall to provide for varying thicknesses and widths of straps securable by the fastener.

3. A bendable one-piece fastener having side walls joined by a front wall and terminating in bent back portions providing cover-receiving recesses, a prong on each of said portions, prongs on the front wall, and additional prongs on and coplanar with the side walls.

4. A one-piece sheet metal fastener having parallel spaced side walls each having parallel spaced score lines therein providing different bending lines for the fastener, a front wall joining the side walls, prongs projecting from the front wall at substantially right angles thereto, and means on the side walls for holding a flexible covering sheet including a portion bent outwardly from the extremity of each side wall and providing a recess outwardly beyond the side wall and between the portion and the adjacent side wall, said portion terminating in a free edge provided with a prong, an end part of the sheet being securable by said prong in the recess, said side walls being bendable into a position substantially parallel to the front wall with the covering sheet as a unit.

5. A handbag fastener comprising a generally U-shaped sheet metal member having spaced parallel side walls joined by a front wall, each of said side walls having an end portion thereof bent back toward the remainder of the side wall to provide a recess for the reception of the end of a flexible cover, a prong projecting from the free end of each of the bent end portions, there being an opening in the side wall for the passage of the prong therethrough, and a set of edge prongs on the front wall to pass through a strap at the rear of the front wall.

6. A bendable one-piece fastener having side walls joined by a front wall, each side wall terminating in an outwardly bent portion having a free edge in outward spaced relation to the side wall and thereby providing a cover-receiving recess between the side wall and said portion, a prong on the free edge of said portion, and additional prongs on the front wall, the length of the front wall being less than the distance between the respective free edges of said portions.

DANIEL I. REITER.